United States Patent [19]
Johansson

[11] 3,934,663
[45] Jan. 27, 1976

[54] ATTACHMENT DEVICE FOR A GAUGE
[76] Inventor: Kurt Eilert Johansson, Timmermangatan 12, S-981 00 Kiruna, Sweden
[22] Filed: Jan. 13, 1975
[21] Appl. No.: 540,759

[30] Foreign Application Priority Data
Jan. 16, 1974 Sweden.............................. 7400523

[52] U.S. Cl................................. 177/137; 177/211
[51] Int. Cl.². ................... G01G 19/08; G01G 3/14
[58] Field of Search..................... 177/136, 138, 211

[56] References Cited
UNITED STATES PATENTS

| | | | |
|---|---|---|---|
| 1,407,078 | 2/1922 | Murray................................ | 177/137 |
| 2,577,691 | 12/1951 | Shrader et al. ..................... | 177/138 |
| 3,092,818 | 6/1963 | Potschka......................... | 177/137 X |
| 3,109,505 | 11/1963 | Davis et al........................... | 177/137 |
| 3,480,095 | 11/1969 | Tuchman............................ | 177/137 |
| 3,794,130 | 2/1974 | Malmgren et al................... | 177/137 |

Primary Examiner—George H. Miller, Jr.
Attorney, Agent, or Firm—Flynn & Frishauf

[57] ABSTRACT

Apparatus for attaching at least one weight sensing gauge to a vehicle supported by at least two spring assemblies such that the weight sensing gauge senses the forces transmitted to the spring assemblies, comprising a bracket secured to the vehicle chassis and at least one attachment means coupled to one end of the weight sensing gauge and pivotally mounted to the bracket. The other end of the weight sensing gauge is pivotally secured to the chassis of the vehicle via the bracket. The attachment means include first and second levers pivotally connected to each other, the first lever being coupled to the first spring assembly of the vehicle and the second lever being coupled to the second spring assembly of the vehicle for mechanically interpreting the forces applied to the spring assemblies and for transmitting the forces to the weight sensing gauge.

13 Claims, 4 Drawing Figures

ATTACHMENT DEVICE FOR A GAUGE

The present invention relates to an attachment device incorporated in a preferably electronic weighing machine for at least one gauge which is adapted to sense the forces which are transmitted to more than one spring assembly provided, on a vehicle, the said attachment device comprising at least one bracket secured to the chassis of the vehicle, in which bracket an attachment means for one end of the gauge is pivotably mounted and arranged to be actuated by the forces which are transmitted to the end of a first spring assembly.

BACKGROUND OF THE INVENTION

Various methods for sensing the load and axle pressure of a vehicle are known. Among them, mention may be made of measuring of deflection in springs, of shear stresses in axle necks, etc. One known method utilizes a gauge placed between a vehicle chassis and an attachment means, which is so designed that the end of the spring assembly slides in the inverted U-shaped attachment means. This latter method has been found highly suitable in order to eliminate various unwanted forces, which otherwise could affect the obtained measuring result negatively, e.g. lateral forces, torsional forces and frictional forces. This method, however, has its limitations when it comes to sensing loads in the ends of a plurality of spring assemblies. For example there exists a certain time lag before force equalization takes place, between several spring assemblies and in many cases the force equalization takes place only when the vehicle starts, i.e. at a time when any overloading has already occurred.

One object of the present invention is to reduce the said time lag to such an extent that its influence when measuring the vehicle load and axle pressure will be negligible. A further object of the invention is to provide an attachment means which can even be located in that end of the spring assembly which is normally stationary and to provide an attachment device which utilizes to the greatest possible extent parts already included in certain vehicles.

BRIEF DESCRIPTION OF THE DRAWINGS

Further details of the invention will become evident from a study of the embodiments illustrated in the accompanying drawings, wherein.

DETAILED DESCRIPTION OF ILLUSTRATED EMBODIMENTS

The principle of the design will now be demonstrated and described with reference to FIG. 1, after which follows the adapted embodiments according to the other Figures.

Figure 1:
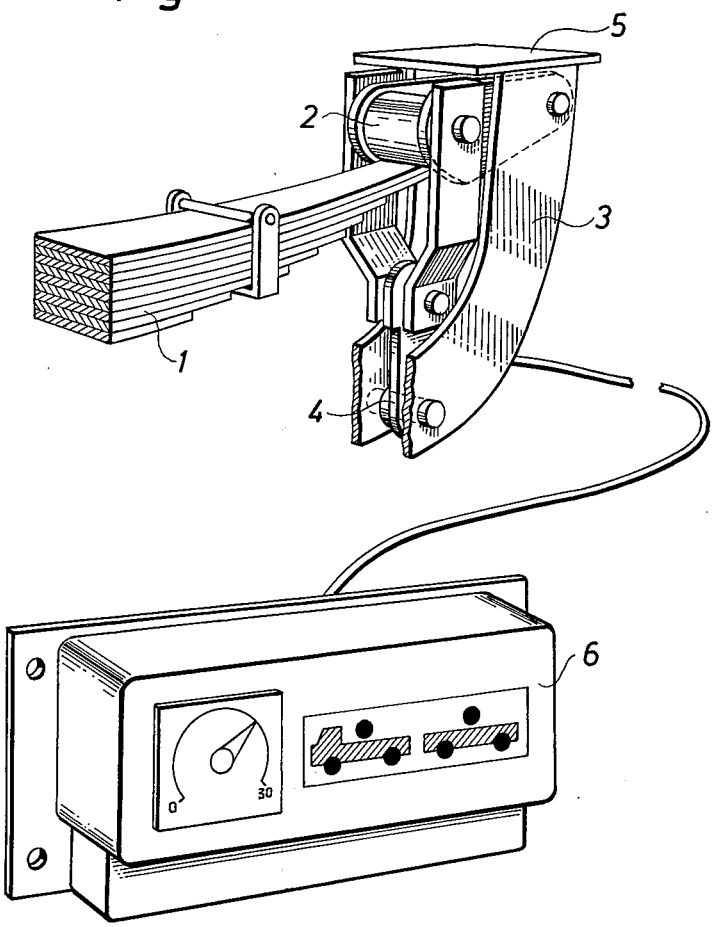
FIG. 1 shows the principle of the construction of a vehicle weighing machine.

In FIG. 1 reference numeral 5 designates an attachment plate for attachment of a bracket 3 to the chassis (not shown) of a vehicle. Between the shanks of the bracket 3 a wire strain gauge is placed on a support plate 4, one end of which is pivotably attached and the other end of which, via a shackle and a roller 2, is connected to one end of a first spring assembly 1. The roller 2 is also articulately connected to the bracket 3 in such a manner that an extension line from spring assembly 1 runs essentially through the articulated attachment of the roller 2 in the bracket 3. The wire strain gauge 4 is electrically connected in turn to an electronic weighing machine 6 (not specifically described) where the total load and axle pressure can be read off on the different vehicle parts, as intimated in FIG. 1 on the instrument 6.

Figure 2:
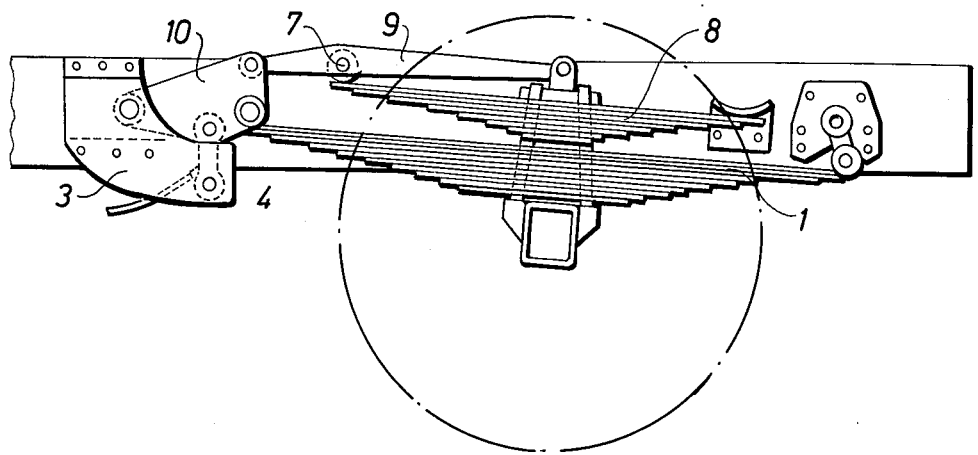
FIG. 2 illustrates the invention applied to a spring assembly provided with an auxiliary spring assembly, i.e. where the spring assemblies work mutually parallel.

Shown in FIG. 2 is an embodiment adapted to a spring assembly 1 fitted with an auxiliary spring assembly 8 connected in parallel with the main spring assembly 1. The attachment device according to the invention is placed in that end of the spring assembly 1 which is normally stationary. The attachment device comprises a bracket 3 which is secured in a not more closely illustrated manner to the chassis of the vehicle and a pivotably mounted attachment means 10. This in turn is articulately connected to one end of a gauge 4, the other end of which is articulately attached to the bracket 3. The attachment means 10 is also articulately connected to one end of the first spring assembly 1 and to the second spring assembly 8 via a lever 9, which is provided with a roller 7 which interacts with one end of the second spring assembly 8. The attachment of the first spring assembly 1 in the attachment means 10 is placed straight under one attachment of the lever 9 in the attachment means 10. The attachment device works in such a manner that the weight of a load placed on the vehicle is transmitted via the bracket 3 to the attachment means 10, which in turn transmits to and distributes the weight on the first spring assembly 1 and, via the lever 9 and the roller 7, on the second spring assembly 8. The gauge 4 which is located between the bracket 3 and the attachment means 10 thus senses the weight exerted on the spring assemblies and issues a thereto directly proportional to the weight exerted on the spring assemblies and feeds the; to the electronic weighing machine 6, which is suitably located in the cab of the vehicle. The additional signal from the shorter auxiliary spring assembly 8 can thus be added linearly to the output signal from the longer main spring assembly 1 thanks to the arrangement with the lever 9 and the roller 7. These signals are dealt with in a manner not specifically described in the electronic weighing machine, in many cases also together with signals from additional gauges placed on the vehicle, and are subsequently presented in the form of rear axle pressure, from axle pressure, bogie pressure or total load on the front of the weighing machine 6.

Figure 3:
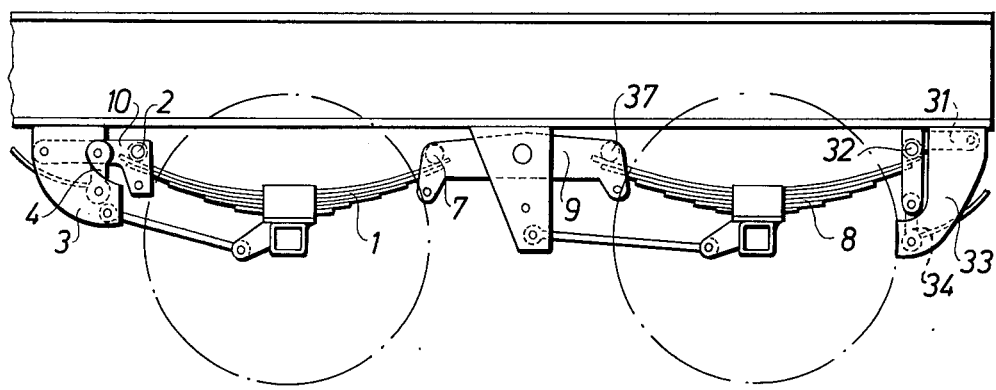
FIG. 3 shows the invention applied to a vehicle where the spring assemblies are connected in series.

Shown in FIG. 3 is a bogie version, in which the attachment devices according to the invention are placed diagonally in the bogie. This type of bogie comprises in principle, two pairs of spring assemblies connected in series, each of which pair is placed on one side each of the vehicle. The brackets 3 and 33 have been slightly differently, depending on where they are located, as evident from FIG. 3, but in principle they function in the same manner, so that only one attachment device will be described in more detail. In the bracket 33, one end of the gauge 34 is pivotably mounted and the other end of the gauge 34 is connected via a roller 32 with one end of the other spring assembly 8, which can thus be moved in relation to the bracket 33 on the roller 32. The other end of the second spring assembly 8 is connected via a second roller 37, a lever 9, which is pivotably mounted in the chassis, and a roller 7 to one end of a first spring assembly 1, the other end of which via a roller 2 is connected to an attachment means 10 which in a previously described manner is connected to the bracket 3 and to the gauge 4. The weight of a load placed on the vehicle is thus transmitted to the two gauges 4 and 34, which emit a signal to the weighing machine 6 which is not shown specifically, the signal being treated there in a manner not more closely described.

Figure 4:
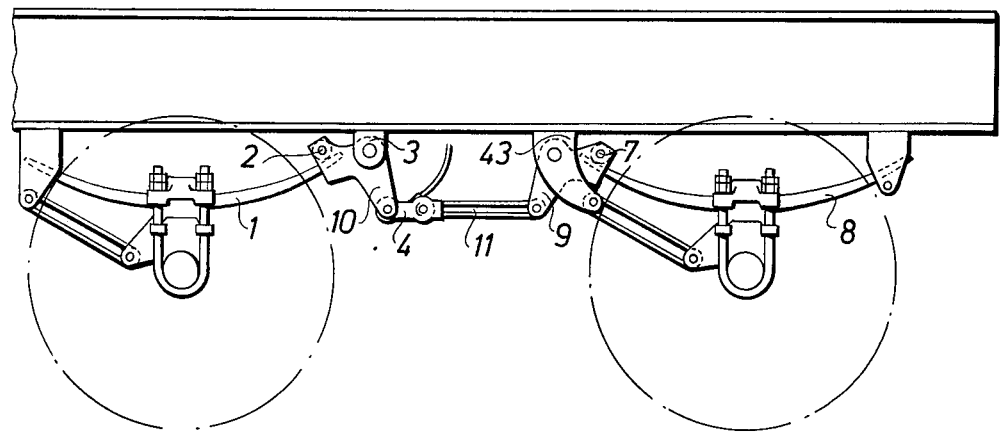
FIG. 4 shows the invention applied to another form of spring assemblies which are connected in series with the aid of a pull equalizing rod.

The embodiment shown in FIG. 4 comprises another type of bogie with a so-called English spring carriage, where a draw equalizing rod 11 normally connects in series the effect of the spring assemblies. In this embodiment, part of the weight of the load placed on the vehicle is transmitted to the first spring assembly via the bracket 3, the attachment means 10 and the roller 2 and to one side of the gauge 4 via the attachment means 10. The other part of the weight is transmitted via a bracket 43, an attachment means 9 and a roller 7 to the second spring assembly 8 and to the other side of the gauge 4 from the attachment means 9 via the draw equalizing 11.

What is claimed is:

1. Apparatus for attaching at least one weight sensing gauge (4,34) in a vehicle having a chassis and at least two spring assemblies (1,8) supporting said chassis, such that the at least one weight sensing gauge (4,34) senses the forces transmitted to said at least two spring assemblies (1,8), said attaching apparatus comprising:
   at least one bracket (3,33,43) secured to the chassis of the vehicle;
   at least one attachment means (10,9) coupled to one end of said at least one weight sensing gauge (4,34) and which is pivotably mounted to said at least one bracket (3,33,43);
   means pivotally securing the other end of said at least one weight sensing gauge (4,34) to said chassis via said at least one bracket (3,33,43);
   said at least one attachment means each including first (10) and second (9) levers pivotally connected to each other; and
   means operatively coupling said first lever (10) of said attachment means to the first spring assembly (1) of the vehicle, and means (7) coupling said second lever (9) of said attachment means to the second spring assembly (8) of the vehicle, for mechanically interpreting the forces applied to the spring assemblies and for transmitting the interpreted forces to said at least one weight sensing gauge (4,34).

2. Apparatus according to claim 1 including a weighing machine (6) coupled to said at least one weight sensing gauge (4,34) for determining said transmitted forces.

3. Apparatus according to claim 1, wherein said spring assemblies (1,8) are connected in parallel (FIG. 2), and wherein said attachment means (10,9) is coupled to that end of said first spring assembly (1) which is normally stationary.

4. Apparatus according to claim 1, wherein said spring assemblies (1,8) are connected in parallel (FIG. 2), and wherein said first lever (10) is pivotally coupled to said at least one bracket (3), and wherein said one end of said at least one weight sensing gauge (4,34) is pivotably secured to said first lever (10) between the point at which said first lever (10) is coupled to said first spring assembly (1) and the point at which said first lever (10) is coupled to said at least one bracket (3).

5. Apparatus according to claim 1, wherein said spring assemblies (1,8) are connected in series (FIG. 3), and comprising two of said attachment means, two of said weight sensing gauges and two of said brackets secured to said chassis, and wherein two of said attachment means (10,31) are pivotably mounted each to its own bracket (3,33), said two attachment means being located in the remote ends of the series connected spring assemblies (1,8) and each of which actuates its own weight sensing gauge (4,34) and each of which via a roller (2,32) interacts with one end of the respective spring assembly (1,8); and wherein said attachment means includes a lever (9) which is balance-suspended in the chassis of the vehicle and located between the spring assemblies (1,8) to distribute via two additional rollers (7,37) the forces exerted on the vehicle among the spring assemblies (1,8) and thus among the weight sensing gauges (4,34).

6. Apparatus according to claim 5, wherein said two attachment means (10,31) are respectively located on either side of and diagonally on the vehicle.

7. Apparatus according to claim 1, wherein said spring assemblies (1,8) are connected in series (FIG. 4), and comprising a draw equalizing rod (11) located between the spring assemblies, two of said attachment means, one of said weight sensing gauges and two of said brackets secured to said chassis, and wherein said two attachment means are each pivotably mounted to its own bracket (3,43) and which are arranged to transmit, each via its own roller (2,7) the forces to the spring assemblies (1,8); and wherein one of said attachment means (10) is pivotably connected to one side of the weight sensing gauge (4) and the other of said attachment means is pivotably connected to the other side of the weight sensing gauge (4).

8. Apparatus according to claim 7, wherein said other of said attachment means is pivotally connected to said other side of said weight sensing gauge (4) via said draw equalizing rod (11).

9. Apparatus according to claim 8, wherein said draw equalizing rod is pivotally connected at one end thereof to said other of said attachment means, and is pivotally connected at the other end thereof to said other side of said weight sensing gauge (4).

10. Apparatus according to claim 1 wherein said spring assemblies (1,8) are connected in parallel (FIG. 2), and wherein the attachment of said first spring assembly (1) to said first lever (10), and of said second lever (9) to said first lever (10) are located in substantially the same vertical line and are turnable relative to each other.

11. Apparatus according to claim 10, wherein said first lever (10) is pivotally coupled to said at least one bracket (3) and wherein said one end of said at least one weight sensing gauge (4,34) is pivotably secured to said first lever (10) between the point at which said first lever (10) is coupled to said first spring assembly (1) and the point at which said first lever (10) is coupled to said at least one bracket (3).

12. Apparatus according to claim 10, wherein said attachment means (10,9) is coupled to that end of said first spring assembly (1) which is normally stationary.

13. Apparatus according to claim 12, wherein said spring assemblies (1,8) are connected in parallel (FIG.

2), and wherein said first lever (10) is pivotally coupled to said at least one bracket (3) and wherein said one end of said at least one weight sensing gauge (4,34) is pivotably secured to said first lever (10) between the point at which said first lever (10) is coupled to said first spring assembly (1) and the point at which said first lever (10) is coupled to said at least one bracket (3).

* * * * *